No. 644,441. Patented Feb. 27, 1900.
J. F. McELROY.
FRICTION ROLLER.
(Application filed Dec. 22, 1897.)
(No Model.)
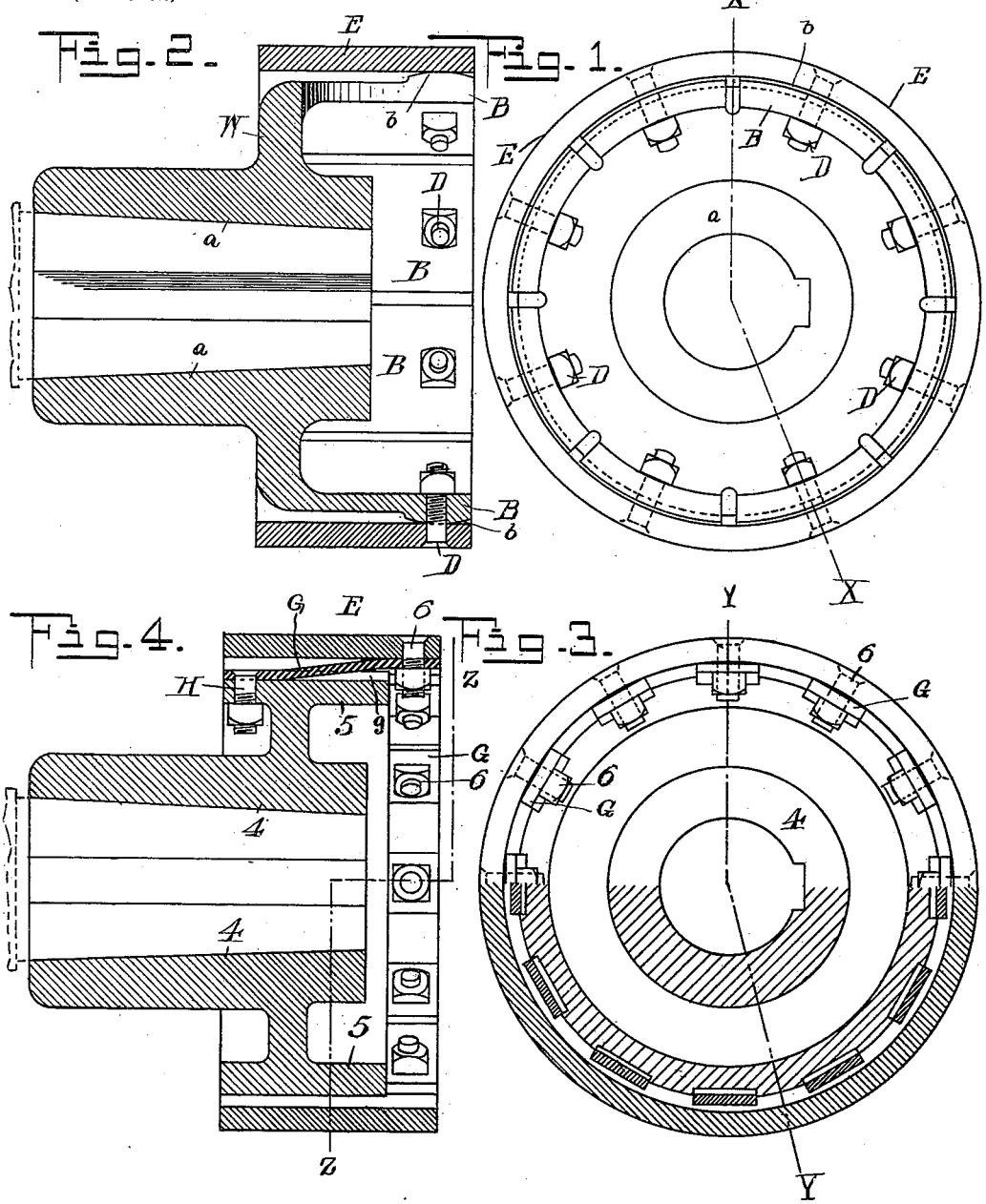
Witnesses:
H. M. Erwin,
Geo. A. Gregg
Inventor
James F. McElroy
by Ward & Cameron,
his Attys

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

FRICTION-ROLLER.

SPECIFICATION forming part of Letters Patent No. 644,441, dated February 27, 1900.

Application filed December 22, 1897. Serial No. 662,977. (No model.)

*To all whom it may concern:*

Be it known that I, JAMES F. MCELROY, a citizen of the United States, residing at the city and county of Albany, State of New York, have invented a new and useful Improvement in Friction-Rollers, of which the following is a specification.

My invention relates to improvements in devices for causing rotation by means of frictional contact; and the objects of my invention are to provide a friction-roller adapted for use in connection with the drive-wheels of locomotives, cars, and other vehicles so constructed and arranged that the noise attendant upon the use of the roller shall be reduced to a minimum and also to provide an elastic friction-roller, its elasticity occasioned by the resiliency of the structure rather than the compressibility of the material. I attain these objects by means of the mechanism illustrated in the accompanying drawings, in which—

Figure 1 is an end elevation. Fig. 2 is a section along the lines $x\,x$ in Fig. 1. Fig. 3 is an end elevation of a modified form, partly in section, along the lines $z\,z$ on Fig. 4; and Fig. 4 is a section along the lines $y\,y$ on Fig. 3.

Similar letters and figures refer to similar parts throughout the several views.

It is a well-known fact that in frictional contact between the drive-wheels of a friction-truck and a friction-roller a considerable amount of noise is occasioned. This is largely due to the fact that the drive-wheels of a truck are seldom, if ever, perfectly round and seldom present an uninterruptedly-smooth surface. There are always irregularities occasioned by the faulty construction or wear of the wheels on the track, pounding, or other causes, and when these irregularities on one wheel come in contact with the friction-roller a vibration takes place which, if the friction-roller is rigid, will be carried to the opposite drive-wheel adjacent to the friction-roller and there meeting with vibration occasioned by the irregularities of said last-mentioned wheel are driven back to the first, causing a mixture of vibrations extending from one drive-wheel to the other through the friction-roller, causing a loud and high-pitched sound. It is to avoid this that I have provided means for allowing the roller to give slightly, preventing the vibrations moving from one drive-wheel to the other.

In the construction of my invention the roller is made up of a hub and a circular web W, supported by the hub $a$ of the casting and extending outward therefrom, being of greater diameter than the hub $a$ of the casting. To the web W, I arrange a series of projecting resilient fingers B B, slightly separated from each other, which fingers are preferably provided near their ends with swelled portions $b$, through which are placed at intervals holes for the bolts D D for securing the tire E in position, as shown in Figs. 1 and 2. A portion of the tire E will thus be separated from the web W and fingers B, which will allow for a certain giving of the tire, and the fingers B, extending from the body of the casting $a$, will also have a certain spring. Thus when the roller as thus constructed is placed between the drive-wheels of a car the inequalities in the surface of the roller or the wheel which tend to cause a vibration in the roller will be taken up by the slight giving in the tire and the casting to which it is supported, thus preventing the vibrations extending to the opposite wheel, with which the roller is in contact, and thus preventing the noise which would otherwise occur.

In the modified form shown in Figs. 3 and 4 I construct the casting having a body 4 and a web 5 and secure to the web 5 a series of resilient fingers consisting of springs G, which are preferably flat pieces of steel, secured at one end by means of the bolts H or other suitable retaining devices within the grooves $g\,g$ in the web 5 and extending outward from the web, as shown in Fig. 4, the other ends of the springs G engaging with the tire E. Bolts 6 6 pass through the tire and through the ends of the springs G, thus holding the tire securely in position and allowing for a giving in the tire which may take place to correspond with irregularities in the surface of the drive-wheel.

What I claim as my invention, and desire to secure by Letters Patent, is—

1. A friction-roller consisting of a hub, a web, secured thereto, a series of resilient fingers projecting from said web extending substantially parallel to the hub, and the tire secured to said fingers, substantially as described.

2. A friction-roller consisting of a hub, a web, secured thereto, a series of fingers secured to said web, said fingers extending substantially parallel to the hub, and a tire secured to said fingers and supported therefrom throughout a portion of its width, substantially as described.

3. A friction-roller consisting of a hub, a web formed on said hub, there being a series of grooves in said web, springs attached at one end to said web and placed within said grooves, a tire resting upon the loose ends of said springs, and means for securing said tire to said springs, substantially as described.

In witness whereof I have hereunto set my hand this 18th day of December, 1897.

JAMES F. McELROY.

Witnesses:
CHAS. B. MITCHELL,
W. W. ERWIN.